(12) United States Patent
Lapis et al.

(10) Patent No.: US 12,139,128 B2
(45) Date of Patent: Nov. 12, 2024

(54) VEHICLE, IN PARTICULAR A MOTOR VEHICLE, AND METHODS FOR CONTROLLING A VEHICLE

(71) Applicants: thyssenkrupp Presta AG, Eschen (LI); thyssenkrupp AG, Essen (DE)

(72) Inventors: Leonard Lapis, Sennwald (CH); Rudolf Csikja, Budapest (HU); Robin Malsam, Feldkirch (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 311 days.

(21) Appl. No.: 17/860,697

(22) Filed: Jul. 8, 2022

(65) Prior Publication Data
US 2023/0012287 A1 Jan. 12, 2023

(30) Foreign Application Priority Data
Jul. 8, 2021 (EP) .................................. 21 184 525

(51) Int. Cl.
*B60W 30/02* (2012.01)
*B60W 10/184* (2012.01)
(Continued)

(52) U.S. Cl.
CPC .......... *B60W 30/02* (2013.01); *B60W 10/184* (2013.01); *B60W 10/20* (2013.01);
(Continued)

(58) Field of Classification Search
CPC .. B60W 30/02; B60W 30/045; B60W 10/184; B60W 10/20; B60W 2040/0872;
(Continued)

(56) References Cited

FOREIGN PATENT DOCUMENTS

| CN | 108 357 485 A | 8/2018 |
|---|---|---|
| CN | 108 791 491 A | 11/2018 |

(Continued)

OTHER PUBLICATIONS

Chatzikomis, Christoforos, et al., "Comparison of Path Tracking and Torque-Vectoring Controllers for Autonomous Electric Vehicles", IEEE Transactions on Intelligent Vehicles, vol. 3 , No. 4, Dec. 2018.

*Primary Examiner* — Hai H Huynh
(74) *Attorney, Agent, or Firm* — thyssenkrupp North America, LLC

(57) ABSTRACT

A vehicle may have actuators, including a drive device with a drive motor that can act on a drive wheel, a brake device with a brake that can act on a drive wheel, and/or a steering device with a steering sensor by way of which the steering angle of a wheel is adjustable, a vehicle movement controller, and a setpoint value input means, a setpoint value processing means for detecting setpoint value settings of the setpoint value input means, to calculate a yaw acceleration setpoint value and translational acceleration setpoint values from the setpoint value settings. The setpoint value processing means may be configured to transfer the calculated yaw acceleration setpoint value and translational acceleration setpoint values to the vehicle movement controller, which is configured to actuate one or more of the actuators such that the yaw acceleration setpoint value and the translational acceleration setpoint values are reached.

15 Claims, 4 Drawing Sheets

(51) Int. Cl.
*B60W 10/20* (2006.01)
*B60W 40/08* (2012.01)

(52) U.S. Cl.
CPC ............ *B60W 2040/0872* (2013.01); *B60W 2520/105* (2013.01); *B60W 2520/125* (2013.01); *B60W 2520/14* (2013.01); *B60W 2540/10* (2013.01); *B60W 2540/12* (2013.01); *B60W 2540/18* (2013.01); *B60W 2710/18* (2013.01); *B60W 2710/20* (2013.01)

(58) Field of Classification Search
CPC ..... B60W 2520/105; B60W 2520/125; B60W 2520/14; B60W 2520/10; B60W 2540/10; B60W 2540/12; B60W 2540/18; B60W 2710/18; B60W 2710/20; B60W 2710/202; B60W 2050/0012; B60W 2050/0295; B60W 2050/0297; B60W 50/029; B60W 50/035; B60W 2720/106; B60W 2720/125; B60W 2720/14; B62D 6/003; B62D 6/005; B62D 15/025
USPC ............................ 701/37, 41, 42, 43, 44, 70
See application file for complete search history.

(56) References Cited

FOREIGN PATENT DOCUMENTS

| | | | |
|---|---|---|---|
| DE | 43 40 932 A1 | 6/1995 | |
| DE | 102020100449 A1 | 7/2021 | |
| DE | 10 2021 202 301 A1 | 9/2022 | |
| JP | H04 287772 A | 10/1992 | |
| JP | 3959860 * | 8/2007 | ............ B60W 40/10 |
| JP | 4094105 * | 6/2008 | ............ B60W 30/02 |

* cited by examiner

VEHICLE, IN PARTICULAR A MOTOR VEHICLE, AND METHODS FOR CONTROLLING A VEHICLE

CROSS REFERENCE TO RELATED APPLICATIONS

This application is a U.S. Non-Provisional Application that claims priority to European Patent Application No. EP 21 184 525.0, filed Jul. 8, 2021, the entire contents of which are incorporated herein by reference.

FIELD

The present disclosure generally relates to vehicles, including motor vehicles and methods for controlling vehicles.

BACKGROUND

A vehicle comprises a number of actuators such as, for example, steering actuators, drive actuators, brake actuators, etc. Furthermore, a vehicle comprises a number of setpoint value input means such as, for example, a steering input means, a brake pedal, an accelerator pedal, etc. In the case of modern vehicles, for example, what are known as steer-by-wire steering systems are used, in the case of which the position of the steered wheels is only coupled indirectly to the steering input means. The actual steering movement is carried out by way of steering actuators which are usually actuated electrically. Comparable systems also exist for brakes and the drive controller. The control and regulating processes which are necessary to this end run substantially in a correspondingly adapted electronic vehicle movement controller.

Patent application DE 10 2020 100 449 which was not yet published at the time of filing describes an invention relating to a motor vehicle steering system, a motor vehicle and a method for controlling a motor vehicle steering system. The invention is concerned with the possibility of redundancy. If one actuator fails, another (set of) actuators can assume the task of the actuator which fails.

Patent application DE 10 2021 202 301 which was not yet published at the time of filing has disclosed a system, comprising a reference movement track device, a cost function device, a dynamic model device, a summing device, a controller, a brake actuator device, a drive actuator device, a steering actuator device, a multiplexer and a vehicle, in particular a motor vehicle. In the case of the abovementioned invention, the subject is the tracking of the vehicle trajectory, the behaviour being given by way of a cost function.

Even though advantageous motor vehicle steering systems and motor vehicles have been described herein, there is nevertheless the requirement for improvement. Thus a need exists for an improved vehicles. In particular, different actuators need to be actuated by way of different setpoint value signals, in particular with a different physical meaning, and a combined effect needs to be realized efficiently.

DETAILED DESCRIPTION

Figure 1:
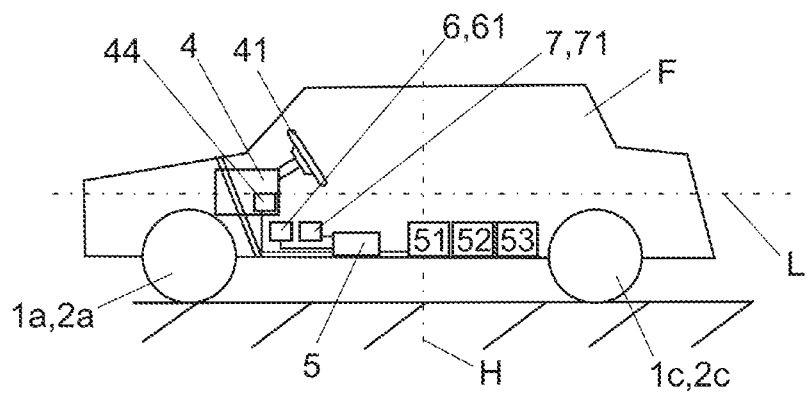
FIG. 1 is a diagrammatic side view of an example vehicle.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

An improved vehicle can be provided by virtue of the fact that the vehicle is equipped with a setpoint value processing means, the setpoint value processing means being configured to detect setpoint value settings of the setpoint value input means, to calculate a yaw acceleration setpoint value and translational acceleration setpoint values, in particular a longitudinal acceleration setpoint value and a lateral acceleration setpoint value, from the setpoint value settings, the setpoint value processing means is configured, furthermore, to transfer the calculated yaw acceleration setpoint value and translational acceleration setpoint values, in particular a longitudinal acceleration setpoint value and a lateral acceleration setpoint value, to the vehicle movement controller, the vehicle movement controller being configured to actuate a selection of or all of the available actuators in such a way that the yaw acceleration setpoint value and the translational acceleration setpoint values, in particular the longitudinal acceleration setpoint value and the lateral acceleration setpoint value, are reached or are at least approximately reached.

A central electronic control unit which is responsible for the vehicle movement controller actuates the actuators which are integrated on board and influence the vehicle movement. A dynamically scalable and adaptable requirement for each actuator is advantageous, in order to utilize the combined effect of the actuators in relation to the vehicle controllability and the redundancy of the actuators.

This solution is particularly advantageous for the redundancy of the actuators. If, for example, the rack actuator fails or the power output is restricted, the drive/brake actuator can assist/assume its functionality, since these actuators also have an influence on the yaw torque of the vehicle. The vehicle movement is coupled more to the input of an autonomous driving system or of the human driver than to the actuator state, in particular rack position.

The system according to the present disclosure described herein is also advantageous, in particular, with respect to the solution described in DE 10 2021 202 301, in that the vehicle movement is described as a yaw torque and is to be formulated directly from actuator torques/forces. Since the actuators are preferably assumed to be electric, the actuating current is present, and it can be a trivial matter for the torque, which results from the current, to be determined.

The system according to the present disclosure described herein is also advantageous, in particular, with respect to the solution described in DE 10 2020 100 449 in that the power output can be adapted with a simultaneous use of a plurality of actuators, and in that the desired vehicle behaviour can be distributed to a plurality of actuator influences. In particular, the combined influence of an alternative steering function and a steering function is not described there.

In addition, DE 10 2020 100 449 describes a principle of actuating other actuators, in order to replace the failed actuator, in order that the vehicle remains driveable. There are various possibilities to realise this. In the present disclosure, one possible technical solution is described in terms of the actuation. It is substantially torque-based and force-based, unlike conventional concepts which are position-based. The yaw torque setpoint value of the vehicle is broken down into the setpoint value of the rack force and the wheel torques. In this case, it is unimportant, for example, how the steered wheels are oriented, but rather that the force/torque flow from the actuators can reach the required vehicle yaw torque.

It can be provided in one advantageous refinement of the present disclosure that the vehicle is equipped with a yaw acceleration sensor for detecting the actual yaw acceleration, a longitudinal acceleration sensor for detecting the actual longitudinal acceleration, and/or a lateral acceleration sensor for detecting the actual lateral acceleration, which are in a connection suitable for signal transmission to the vehicle movement controller. As a result, a feedback information item can advantageously be generated, in order to realise reference tracking.

It can be provided in a further advantageous refinement of the present disclosure that the setpoint value input means is a steering angle sensor, a brake pedal sensor, an accelerator pedal sensor, autonomous driving systems and/or an eye movement detection system. The above-mentioned components are usually part of larger units such as, for example, steering devices, braking devices, accelerator pedal devices. Since they are usually configured in accordance with the by-wire principle, they are advantageously suitable in conjunction with an electronic vehicle movement controller and/or an electronic setpoint value processing means.

It can be provided in a further advantageous refinement of the present disclosure that the vehicle movement controller is configured to actuate the respective actuators by means of steering drive setpoint value, drive motor setpoint value and/or brake setpoint value. In general, wheel actuators and/or individual wheel actuators are provided which are also called a road wheel actuator or RWA. These actuators comprise single or a plurality of the abovementioned actuators in combination depending on the embodiment. They are generally called RWA in the further text.

It can be provided in a further advantageous refinement of the present disclosure that
the vehicle comprises a front and/or rear RWA, and chassis kinematics,
the chassis kinematics comprising a front and/or rear steering rack, and a brake/drive system, the vehicle movement controller being configured to transmit a rack force setpoint value to the front and/or rear RWA,
the front and/or rear RWA being configured to transmit a motor torque setpoint value to the chassis kinematics,
the vehicle movement controller being configured to transmit a wheel torque setpoint value to the brake/drive system.

It can be provided in a further advantageous refinement of the present disclosure that the vehicle, in particular the vehicle movement controller, is configured in such a way that
a yaw acceleration of the vehicle can be formulated from a rack influence, in particular rack of a front and/or rear steering device, and an axle yaw torque influence, in particular a front and/or rear drive device, it being possible, in particular,
for each rack, in particular steering rack, to be controlled directly by way of a torque setpoint value of a drive device, in particular by way of a directly requested rack force, it being possible, in particular,
for each rack to be controlled indirectly by way of a torque setpoint value of a brake and a drive device, in particular in a manner which is dependent on the torque steer effect of the suspension system, it being possible, in particular,
for the yaw torque of each axle, in particular of the front and/or rear axle, to be controlled directly by way of a torque setpoint value of a brake and a drive device.

It can be provided in a further advantageous refinement of the present disclosure that the vehicle movement controller is configured to calculate a yaw torque setpoint value from vehicle inertia parameters, in the case of a given yaw acceleration setpoint value.

It can be provided in a further advantageous refinement of the present disclosure that the vehicle movement controller is configured such that, with knowledge of the available actuators, their power outputs and their effect on the rack force and the yaw torque, a transfer function for each torque request of the actuators can be implemented for the respective ambient and vehicle conditions, in particular friction of the road tyres, and radius of the suspension system etc.

It can be provided in a further advantageous refinement of the present disclosure that the vehicle movement controller is configured in conjunction with the setpoint value processing means as a multiple input multiple output controller which is configured to use a transfer function as feedforward boost, in order to control the actuators.

It can be provided in a further advantageous refinement of the present disclosure that the vehicle movement controller is configured to measure the vehicle movement and the actuator saturation, the vehicle movement controller being configured to output a feedback information item, in order to realise reference tracking.

Another example object of the present disclosure is to propose an advantageous method for moving a vehicle. In some examples, this object can be achieved by way of a method for the advantageous movement of the vehicle, including:
detecting of setpoint value settings of the setpoint value input means by way of the setpoint value processing means, in particular the steering angle $\alpha$ of the steering wheel, the actuating angle of the brake pedal and/or the actuating angle of the accelerator pedal;
calculating of a yaw acceleration setpoint value and translational acceleration setpoint values, in particular a longitudinal acceleration setpoint value and a lateral acceleration setpoint value by way of the setpoint value processing means;
transmitting of the calculated values from the setpoint value processing means to the vehicle movement controller;
actuating of a selection of or all of the available actuators by way of the vehicle movement controller in such a way that the yaw acceleration setpoint value and the translational acceleration setpoint values, in particular the longitudinal acceleration setpoint value and the lateral acceleration setpoint value, are reached or are at least approximately reached.

With regard to the advantages which result herefrom, reference can be made to the advantages which have already been mentioned with respect to the vehicle according to the present disclosure.

It can be provided in one advantageous refinement of the present disclosure that the yaw acceleration sensor feeds back an actual yaw acceleration, the longitudinal acceleration sensor feeds back an actual longitudinal acceleration, and/or the lateral acceleration sensor feeds back an actual lateral acceleration to the vehicle movement controller. As a result, a feedback information item can advantageously be generated, in order to realise reference tracking.

It can be provided in one advantageous refinement of the present disclosure that
   the vehicle movement controller transmits a rack force setpoint value to the front/rear RWA,
   the front/rear RWA transmits a motor torque setpoint value to the chassis kinematics,
   the vehicle movement controller transmits a wheel torque setpoint value to the brake/drive system.

It can be provided in one advantageous refinement of the present disclosure that
   setpoint value inputs from the driver or from an automated driving algorithm are converted into yaw acceleration values, in particular over the vertical axis, and translational acceleration values, in particular longitudinally and laterally, and/or
   an actual yaw acceleration is formulated from a rack influence, in particular rack of a front and/or rear steering device, and an axle yaw torque influence, in particular of a front and/or rear drive device,
   each rack, in particular steering rack, being controlled directly by way of a torque setpoint value of the drive device, in particular by way of a directly requested rack force,
   each rack being controlled indirectly by way of a torque setpoint value of a brake and a drive device, in particular in a manner which is dependent on the torque steer effect of the suspension system,
   the yaw torque of each axle, in particular front and/or rear axle, being controlled directly by way of the torque setpoint value of the brake and the drive device.

It can be provided in one advantageous refinement of the present disclosure that, in the case of a given yaw acceleration setpoint value, a yaw torque setpoint value is calculated from the vehicle inertia parameters, and/or, with a knowledge of the available actuators, their power output and their effect on the rack force and the yaw torque, a transfer function for each torque request of the actuators is implemented for the respective ambient and vehicle conditions, in particular friction of the road tyres and radius of the suspension system, and/or that the vehicle movement controller is configured as a multiple input multiple output controller, a transfer function being used as feedforward boost, in order to control the actuators, and/or that the vehicle movement controller measures the vehicle movement and the actuator saturation, the vehicle movement controller outputting a feedback information item, in order to realise reference tracking.

The Following Reference Signs are Used in the Figures:
α steering angle
β wheel angle/vehicle angle
G yaw torque
FZ influence of the rack force
VG influence of front axle yaw torque
HG influence of rear axle yaw torque
B bus system
FK chassis kinematics
VG influence of front axle yaw torque
HG influence of rear axle yaw torque
RWA front/rear RWA (Road Wheel Actuator)
VHL front/rear steering rack
BAS brake/drive system
H vertical axis
L longitudinal axis
Q lateral axis
F vehicle, in particular motor vehicle
GS yaw acceleration setpoint value
LS longitudinal acceleration setpoint value
QS lateral acceleration setpoint value
GT actual yaw acceleration (yaw acceleration actual value)
LT actual longitudinal acceleration (longitudinal acceleration actual value)
QT actual lateral acceleration (lateral acceleration actual value)
S41 setpoint value setting of the steering angle sensor
S61 setpoint value setting of the brake pedal sensor
S71 setpoint value setting of the accelerator pedal
SAD setpoint value setting of the autonomous controller
S42 steering drive setpoint value
S31 drive motor setpoint value
S2 brake setpoint value
ZFS rack force setpoint value
WTS wheel torque setpoint value
MTS motor torque setpoint value
1a-d wheel
2a-d brake
3 drive device
4 steering device
5 vehicle movement controller
6 brake pedal
7 accelerator pedal
8 setpoint value processing means
31 drive motor
32 drive axis
41 steering angle sensor
42 steering drive
43 steering rack
44 steering wheel
45 steering control device
51 yaw acceleration sensor
52 longitudinal acceleration sensor
53 lateral acceleration sensor
61 brake pedal sensor
71 accelerator pedal sensor Here, it goes without saying that features and details that are described in conjunction with a method also apply in conjunction with the apparatus according to the present disclosure and vice versa, with the result that reference is always made or can always be made mutually with regard to the disclosure with respect to the individual aspects of the present disclosure. Moreover, a possibly described method according to the present disclosure can be carried out by way of the apparatus according to the present disclosure.

The terminology used herein serves merely the purpose of description of certain embodiments and is not intended to restrict the disclosure. As used herein, the singular forms "a/an" and "the" are also intended to comprise the plural forms if the context does not clearly show something else.

In addition, it will become clear that the expressions "has" and/or "having", when used in this description, specify the presence of the indicated features, integers, steps, operations, elements and/or components, but do not rule out the presence or the addition of one or more other features, integers, steps, operations, elements, components and/or groups. As used herein, the expression "and/or" comprises every arbitrary element and all combinations of one or more of the associated, listed elements.

Figure 3:
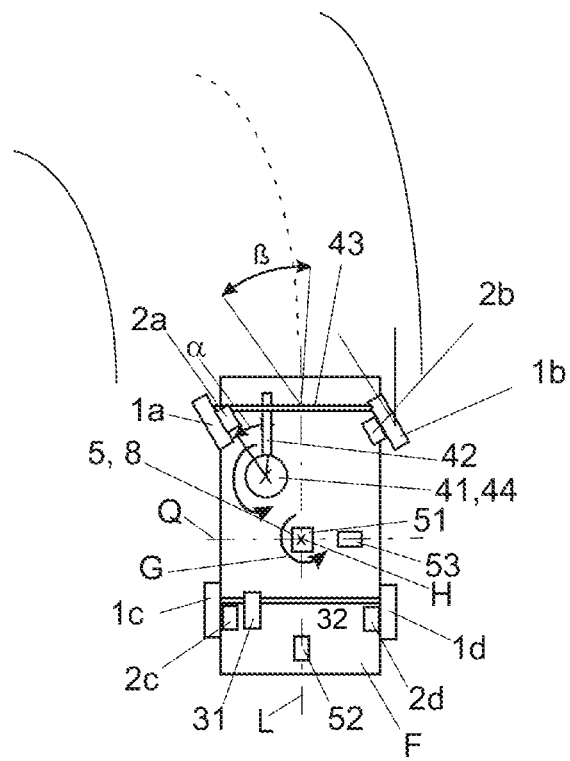
FIG. 3 is a diagrammatic top view of a vehicle.

Reference is made first of all to FIGS. 1 and 3.

A vehicle F, in particular a motor vehicle, comprises substantially two front wheels 1a, 1b, and two rear wheels 1c, 1d. The front wheels and the rear wheels can be equipped with brakes 2a-2d. Furthermore, the vehicle has a brake pedal 6 with an associated brake pedal sensor 61, and an accelerator pedal 7 with an associated accelerator pedal sensor 71. A longitudinal axis L and a vertical axis H are illustrated here for geometric orientation. Furthermore, a steering device 4 is shown diagrammatically which is intended to be configured, for example, as a steer-by-wire steering system.

Figure 2:
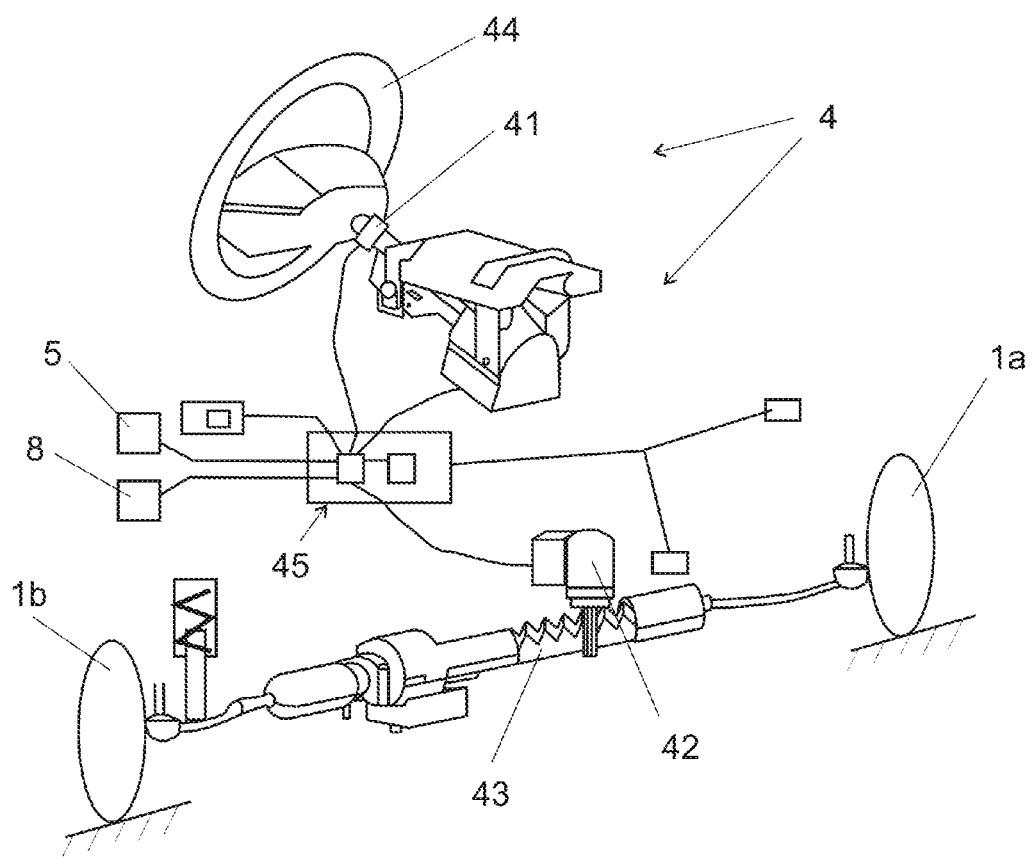
FIG. 2 is a schematic view of an example steering device in accordance with the steer-by-wire principle.

FIG. 2 diagrammatically shows a steering device 4, in particular a steer-by-wire steering system. In particular, a steering angle sensor 41, a steering drive 42, a rack 43, a steering wheel 44 and a steering controller 45 are shown. The driver (not shown) actuates the steering wheel 44. The steering angle sensor 41 detects the angle of the steering wheel and transmits the detected steering angle electrically to a suitable steering control unit 45. The steering control unit 45 in turn controls the steering drive 42 which acts on a rack 43. The rack 43 is in turn connected to the two wheels 1a, 1b which are shown here, which can be front wheels of a vehicle F in the example which is shown here, and rotates them in accordance with the degree of freedom of the wheel suspension system thereof into the angular position which is requested by way of the steering wheel 44. The fundamental function and further details of a steer-by-wire steering system of this type are well-known to a person skilled in the art.

FIG. 3 shows a vehicle F, in particular a motor vehicle, in a diagrammatic view from above. It can be seen that the vehicle F is equipped with a drive device 3, in particular a drive motor 31 and a drive axle 32 for the rear wheels 1c, 1d. One drive device for the front wheels is of course also conceivable, or also in each case separate drive devices for each individual wheel.

It is provided, in addition, that all the wheels 1a-1d are equipped in each case with a brake 2a-2d. In addition, a longitudinal axis L, transverse axis Q and a vertical axis H are shown for geometric orientation. In addition, the yaw torque of the vehicle F is intended to be indicated by way of the arrow G. The longitudinal axis can accordingly also be called a longitudinal axis and the transverse axis can accordingly also be called a lateral axis.

It can be seen that the front wheels 1a, 1b are part of a front axle, and the rear wheels 1c, 1d are accordingly part of a rear axle. Further components of a front and rear axle result in accordance with the overall design of the respective axle or vehicle.

In addition, the steering device 4 which has already been outlined above, in particular the steer-by-wire steering system, is provided for the front wheels 1a, 1b, with the result that at least the steering wheel 44, the steering drive 42 and the rack 43 are also depicted here. In addition, the front wheels 1a, 1b and the rear wheels 1c, 1d are also to be equipped with in each case one brake 2a-2d.

The vehicle F is in driving operation, the vehicle being situated before a bend. At this time, the driver uses the steering wheel 44 to input a steering angle α which is detected by way of the steering device 4. The steering control unit 45 subsequently actuates the steering drive 42 which transmits the steering request via the rack 43 to the two front wheels 1a, 1b. This results in a desired wheel angle or vehicle angle β which corresponds to that angle of the vehicle which is expected by the driver.

Figure 4:
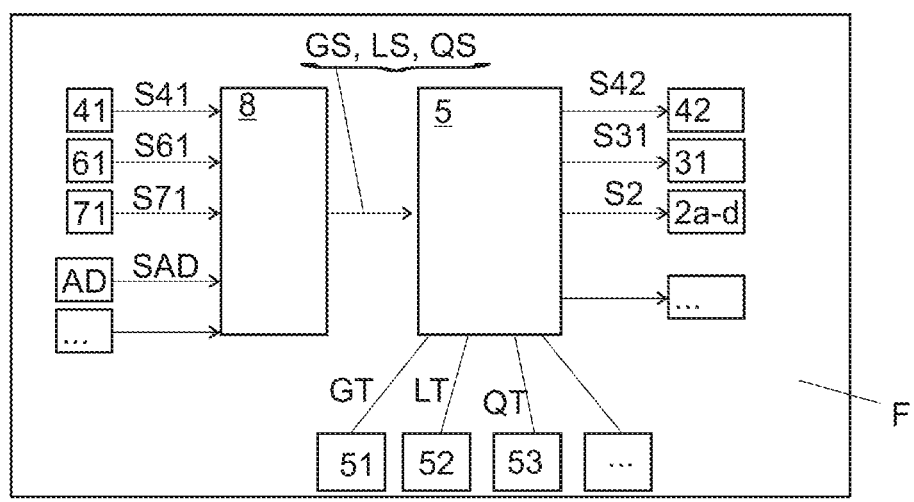
FIG. 4 is a diagrammatic view of the vehicle and a method.

FIG. 4 diagrammatically shows a vehicle according to the present disclosure and the method according to the present disclosure.

It is provided that the vehicle F has actuators A. Drive-technology structural units which physically convert an electric signal (commands output by the control computer) into mechanical movements or changes and therefore intervene actively into the controlled process are fundamentally called an actuator.

An actuator can be, for example, a drive motor 31 which can act on at least one wheel 1a-d, one or more brakes 2a-d which can act on at least one wheel 1a-d, and/or a steering drive 42, by way of which the wheel angle α of at least one wheel 1a-d can be adjusted. Further actuators are conceivable. It is preferably provided that a plurality of actuators, but at least two actuators, are provided in the vehicle. In this respect, the vehicle and its controller can also be called a multiple-actuator vehicle.

Furthermore, setpoint value input means are provided for controlling the vehicle. This can be, for example, the steering angle sensor 42, the brake pedal sensor 61 and/or the accelerator pedal sensor 71. The setpoint value input means fundamentally forms/form the interface between the driver and the vehicle. Further setpoint value input means are conceivable, for example also autonomous driving systems or else an eye movement detection system, etc. This is intended to be indicated, in particular, by way of the small box with the " . . . ".

Furthermore, a vehicle according to the present disclosure is equipped with a setpoint value processing means 8, and a vehicle movement controller 5. The processing device 5 or the setpoint value processing means 8 can be, in particular, a computer with data memory and processor which is equipped with various interfaces. A processing device 5 of this type can also be called an electronic control/regulating unit.

The setpoint value processing means 8 is configured to detect setpoint value settings S41, S61, S71, SAD of the setpoint value input means 41, 61, 71, AD, and to calculate a yaw acceleration setpoint value GS and translational acceleration setpoint values, in particular a longitudinal acceleration setpoint value LS and a lateral acceleration setpoint value QS, from the setpoint value settings, and to transmit the calculated yaw acceleration setpoint values GS and translational acceleration setpoint values, in particular a longitudinal acceleration setpoint value LS and a lateral acceleration setpoint value QS, to the vehicle movement controller 5.

The vehicle movement controller 5 is configured to actuate a selection of or all of the available actuators in such a way that the yaw acceleration setpoint value GS and the translational acceleration setpoint values, in particular the longitudinal acceleration setpoint value LS and the lateral acceleration setpoint value QS, are reached or are at least approximately reached.

An actuator-specific actuation by means of steering drive setpoint value S42, drive motor setpoint value S31 and/or brake setpoint value S2 is conceivable. The actuation can also take place, for example, by way of a rack force setpoint value ZFS, a wheel torque setpoint value WTS and/or a motor torque setpoint value MTS, as shown in a following example according to FIG. 5.

Furthermore, it can preferably be provided that the motor vehicle is equipped with a yaw acceleration sensor 51 for detecting the actual yaw acceleration GT, a longitudinal acceleration sensor 52 for detecting the actual longitudinal acceleration LT, and/or a lateral acceleration sensor 53 for detecting the actual lateral acceleration QT, which are in a connection suitable for signal transmission to the vehicle movement controller 5.

The method according to the present disclosure for controlling a motor vehicle according to the present disclosure is designed as follows. It goes without saying that only some selected method steps are shown here, as are helpful for the comprehension of the method according to the present disclosure. The method can comprise further steps or intermediate steps which are known to a person skilled in the art. It is provided, furthermore, that the method runs in real time and, in particular, continuous evaluation, calculation, transmission, etc. takes place during driving operation.

The setpoint value settings of the setpoint value input means 41, 61 and 71 are detected by the setpoint value processing means 8, that is to say, for example, the steering angle α of the steering wheel 44, the actuating angle of the brake pedal 6 and/or the actuating angle of the accelerator pedal 7.

Herefrom, the setpoint value processing means 8 calculates a yaw acceleration setpoint value GS and translational acceleration setpoint values, in particular a longitudinal acceleration setpoint value LS and a lateral acceleration setpoint value QS.

The calculated yaw acceleration setpoint value GS and translational acceleration setpoint values, in particular a longitudinal acceleration setpoint value LS and a lateral acceleration setpoint value QS, are transmitted to the vehicle movement controller 5. Values are fundamentally transmitted between the components by means of electric signals. Bus systems, but also other transmission variants, are conceivable, for example.

In a next step, the vehicle movement controller 5 actuates a selection of or all of the available actuators 31, 42, 2a-d in such a way that the yaw acceleration setpoint value GS and the translational acceleration setpoint values, in particular the longitudinal acceleration setpoint value LS and the lateral acceleration setpoint value QS, are reached or are at least approximately reached.

Feedback of the corresponding sensors 51, 52, 53 advantageously takes place with regard to the actual yaw acceleration value TG and the translational acceleration values, in particular the longitudinal acceleration value LT and the lateral acceleration value QT. As a result, tracking or checking of the regulation can advantageously be achieved.

Figure 5:
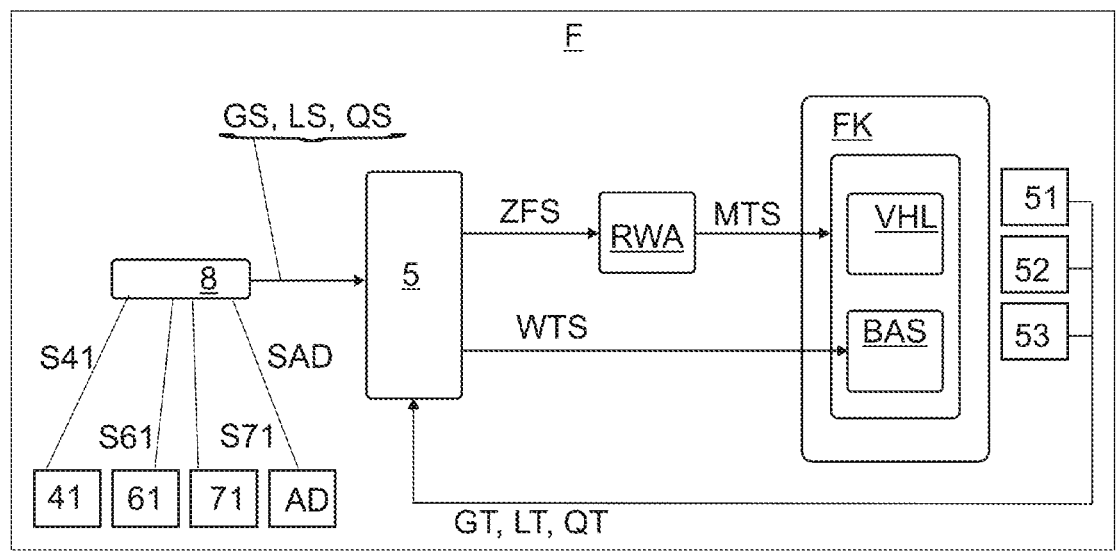
FIG. 5 is another diagrammatic view of the vehicle and a method.

FIG. 5 diagrammatically shows one embodiment of the vehicle according to the present disclosure and the method according to the present disclosure.

Reference can be made substantially here to the statements made above.

The vehicle F which is shown here comprises, in addition, a front/rear RWA, and chassis kinematics FK. The chassis kinematics FK comprises substantially a front and/or rear steering rack 43, and a brake/drive system BAS. The arrows in the illustration in each case symbolize data or signal flows between the respective devices.

The steering rack 43 is part of a steering device 4. Accordingly, the rack 43 can act on the front wheels 1a, 1b and/or the rear wheels 1c, 1d.

The brake/drive system BAS can accordingly comprise one or more drive devices 3, in particular drive motors 31, and/or brakes 2a-2d.

The vehicle movement controller 5 transmits a rack force setpoint value ZFS to the front/rear RWA.

The front/rear RWA transmits a motor torque setpoint value MTS to the chassis kinematics FK.

The vehicle movement controller 5 transmits a wheel torque setpoint value WTS to the brake/drive system BAS.

The corresponding sensors 51, 52, 53 of the vehicle transmit an actual yaw acceleration GT and an actual longitudinal/lateral acceleration LT, QT to the vehicle movement controller 5.

Figure 6:
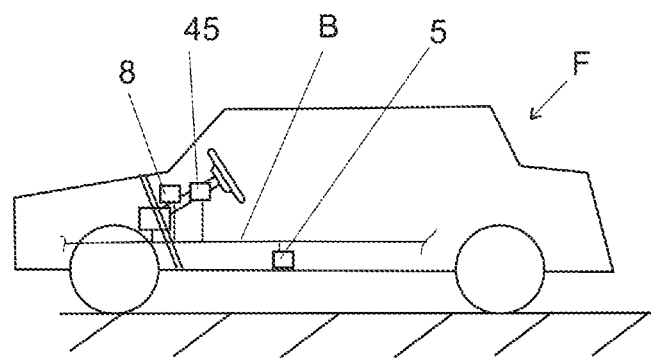
FIG. 6 is a schematic view of a vehicle with a bus system.

FIG. 6 shows a vehicle F for a vehicle according to the present disclosure with a bus system B. Furthermore, the accelerator pedal 7 and brake pedal 6 are shown diagrammatically there.

Figure 7:
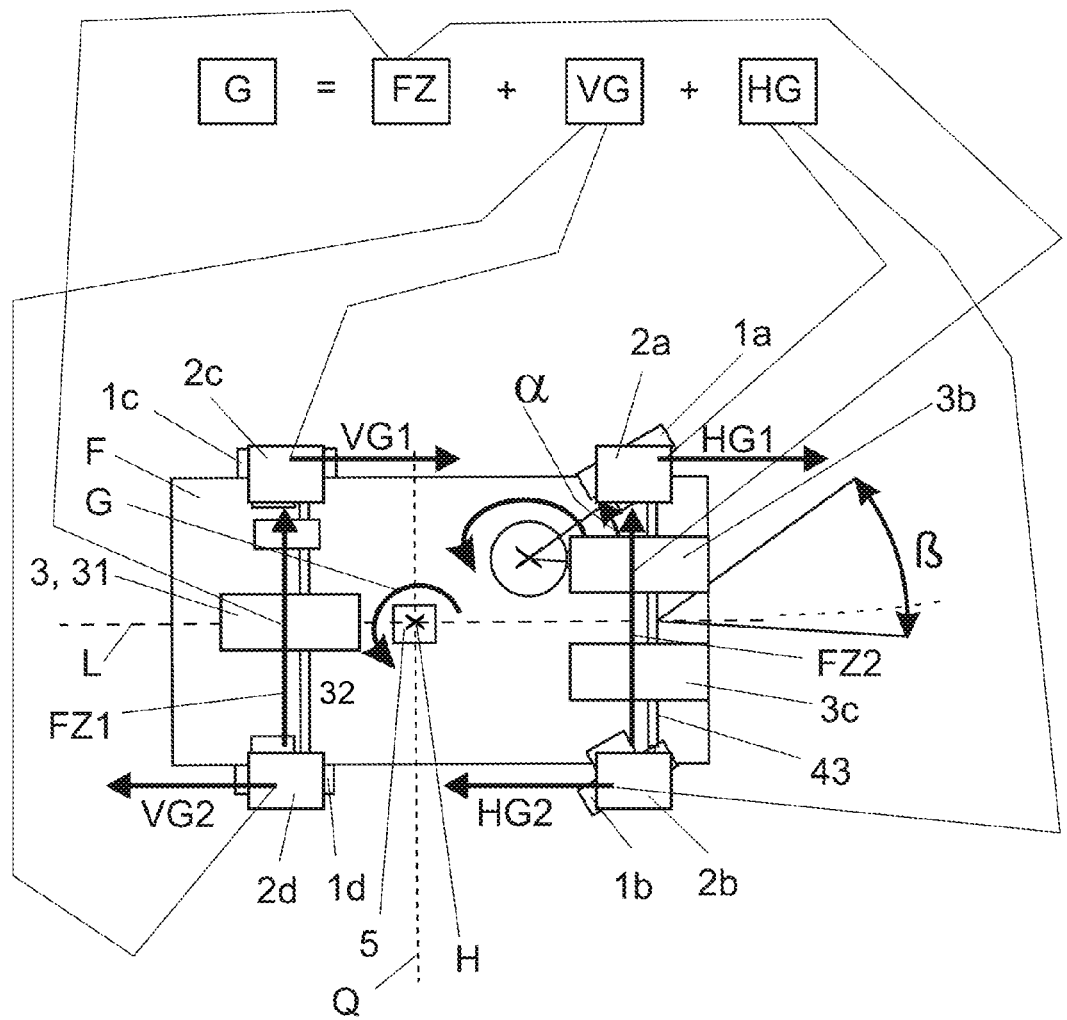
FIG. 7 is a diagrammatic top view of an example vehicle.

FIG. 7 shows one embodiment of a vehicle F according to the present disclosure. Here, furthermore, an exemplary link or correlation between the vehicle yaw torque G, influence of the rack force FZ, influence of the front axle yaw torque VG and rear axle yaw torque HG is to be clarified.

The vehicle F comprises the left-hand front wheel 1a and the right-hand front wheel 1b, and the left-hand rear wheel 1c and the right-hand rear wheel 1d.

The vehicle F comprises the brake 2a which acts on the left-hand front wheel 1a, the brake 2b which acts on the right-hand front wheel 1b, the brake 2c which acts on the left-hand rear wheel 1c, and the brake 2d which acts on the right-hand rear wheel 1d.

The vehicle comprises a steering device 4 which acts on the front wheels 1a, 1b and has at least one rack 43. With regard to the further details of the steering device, reference can be made to the statements made above.

The vehicle F comprises a first drive device 3 for the rear wheels 1c, 1d; in particular, the drive device 3 comprises a drive motor 31 and a drive axle 32.

The vehicle F comprises a second drive device 3a and a third drive device 3b for the front wheels 1a, 2a.

The system or vehicle F is accordingly equipped with a vehicle movement controller 5 and setpoint value processing means 8. Furthermore, the longitudinal axis L, lateral axis Q and vertical axis H are also illustrated here. Here too, the reference sign G denotes the arrow which is intended to symbolize the yaw torque of the vehicle. With regard to the steering angle α and the vehicle angle β, reference can be made to the statements made above.

In that exemplary embodiment of the vehicle which is shown here, a connection to braking/driving actuators— alternative steering functions is intended to be shown which is to be distinguished, in particular, by wheel torque regulation
 4-wheel brakes
 test of the vehicle configuration based on the drive torque at the wheel level
 brake/drive input generates rack force (suspension advantage)
 rack force is a combined effect of steering function and alternative steering function.

It is provided, furthermore, for the system according to the present disclosure, in particular, that the yaw torque G results from the sum of the influence of the rack force FZ, the influence of the front axle yaw torque VG and the rear axle yaw torque HG.

Here, the influence of the rack force FZ is to be indicated by way of an arrow FZ1 between the right-hand rear wheel 1d and the left-hand rear wheel 1c, and by way of an arrow FZ2 from the right-hand front wheel 1b to the left-hand front wheel 1a. The arrows FZ1, FZ2 are oriented in the lateral direction and in an identical direction.

The influence of a front axle yaw torque VG is to be indicated by way of an arrow VG1 from the left-hand rear wheel 1c and an arrow VG2 from the right-hand rear wheel 1d. The arrows VG1, VG2 are oriented in the longitudinal direction L, but in opposite directions.

The influence of a rear axle yaw torque is to be indicated by way of an arrow HG1 from the left-hand front wheel 1a and an arrow HG2 from the right-hand front wheel 1b. The arrows HG1, HG2 are oriented in the longitudinal direction L, but in opposite directions.

The present disclosure is particularly advantageously suitable for vehicles with the by-wire systems and/or autonomous functions. In particular, a central electronic control unit, in particular a vehicle movement controller 5 or setpoint value processing means 8 which is responsible for the vehicle movement controller, is described here which actuates the actuators which are integrated on board and influence the vehicle movement. Possible actuators are, for example, the drive device, in particular the drive motor, the brakes, the steering device, in particular the steering drive or the steering rack. An active chassis is also possible as an actuator. A dynamically scalable and adaptable requirement for each actuator is advantageous, in order to utilize the combined effect of the actuators in relation to the vehicle controllability and the redundancy of the actuators.

The drive motor 31 an be both an electric motor and an internal combustion engine.

Instead of the steering wheel, a joystick, accelerator pedals and eye movement detection means are also possible.

The system can be used for the front axle and/or the rear axle.

The setpoint values which are transmitted by the setpoint value processing means are mapped, in particular, in a desired trajectory, in particular provided setpoint yaw torque values, setpoint pitch torque values, setpoint roll torque values and/or setpoint acceleration values.

What is claimed is:

1. A motor vehicle comprising:
    actuators, including at least one of:
        a drive device with a drive motor that is configured to act on a wheel,
        a brake device with a brake that is configured to act on a wheel, or
        a steering device with a steering sensor, wherein by way of the steering device a steering angle of a wheel is adjustable;
    a vehicle movement controller;
    setpoint value input means for inputting setpoint value settings; and
    setpoint value processing means configured to:
        detect the setpoint value settings of the setpoint value input means,
        calculate a yaw acceleration setpoint value and translational acceleration setpoint values, including a longitudinal acceleration setpoint value and a lateral acceleration setpoint value, from the setpoint value settings, and
        transfer the yaw acceleration setpoint value and the translational acceleration setpoint values that are calculated, including the longitudinal acceleration setpoint value and the lateral acceleration setpoint value, to the vehicle movement controller,
    wherein the vehicle movement controller is configured to actuate one or more of the actuators such that the yaw acceleration setpoint value and the translational acceleration setpoint values, including the longitudinal acceleration setpoint value and the lateral acceleration setpoint value, are reached.

2. The motor vehicle of claim 1 comprising at least one of the following, which is/are in a connection suitable for signal transmission to the vehicle movement controller:
    a yaw acceleration sensor configured to detect an actual yaw acceleration;
    a longitudinal acceleration sensor configured to detect an actual longitudinal acceleration; or
    a lateral acceleration sensor configured to detect an actual lateral acceleration.

3. The motor vehicle of claim 1 wherein the setpoint value input means is a steering angle sensor, a braked pedal sensor, an accelerator pedal sensor, an autonomous driving system, or an eye movement detection system.

4. The motor vehicle of claim 1 wherein the vehicle movement controller is configured to actuate the actuators by way of at least one of a steering drive setpoint value, a drive motor setpoint value, or a brake setpoint value.

5. The motor vehicle of claim 1 comprising a front and/or rear road wheel actuator and chassis kinematics, wherein the chassis kinematics comprise a front and/or rear steering rack and a brake/drive system, wherein the vehicle movement controller is configured to transmit a rack force setpoint value to the front and/or rear road wheel actuator, with the front and/or rear road wheel actuator being configured to transmit a motor torque setpoint value to the chassis kinematics, wherein the vehicle movement controller is configured to transmit a wheel torque setpoint value to the brake/drive system.

6. The motor vehicle of claim 1 wherein the vehicle movement controller is configured such that
    a yaw acceleration can be formulated from a rack influence of a front and/or rear steering device and from an axle yaw torque influence of a front and/or rear drive device,
    each steering rack is controllable directly by way of a directly requested rack force,
    each steering rack is controllable indirectly by way of a torque setpoint value of the brake and the drive device, in a manner that depends on a torque steer effect of a suspension system,
    the axle yaw torque of each axle is controllable directly by way of a torque setpoint value of the brake and the drive device.

7. The motor vehicle of claim 1 wherein the vehicle movement controller is configured to calculate a yaw torque setpoint value from vehicle inertia parameters based on a yaw acceleration setpoint value.

8. The motor vehicle of claim 1 wherein the steering device is equipped with a rack, wherein each rack is controllable directly by way of a directly requested rack force of the drive device, wherein the vehicle movement controller is configured such that based on power outputs of the actuators and the actuators' effect on the rack force and yaw torque, a transfer function for each torque request of the actuators can be implemented for respective ambient and vehicle conditions that include friction of road tires and radius of a suspension system.

9. The motor vehicle of claim 1 wherein the vehicle movement controller is configured in conjunction with the setpoint value processing means as a multiple input multiple output controller that is configured to use a transfer function as feedforward boost to control the actuators.

10. The motor vehicle of claim 1 wherein the vehicle movement controller is configured to measure vehicle movement and actuator saturation, the vehicle movement controller being configured to output a feedback information item to realize reference tracking.

11. A method for controlling the motor vehicle of claim 1, wherein the method comprises:
    detecting the setpoint value settings of the setpoint value input means by way of the setpoint value processing means, including a steering angle of a steering wheel, an actuating angle of a brake pedal, and/or an actuating angle of an accelerator pedal;
    calculating a yaw acceleration setpoint value and translational acceleration setpoint values, including a longitudinal acceleration setpoint value and a lateral acceleration setpoint value;
    transmitting the calculated values from the setpoint value processing means to the vehicle movement controller; and
    actuating one or more of the actuators by way of the vehicle movement controller such that the yaw acceleration setpoint value and the translational acceleration setpoint values, including the longitudinal acceleration setpoint value and the lateral acceleration setpoint value, are reached.

12. The method of claim 11 wherein a yaw acceleration sensor feeds back an actual yaw acceleration, wherein a longitudinal acceleration sensor feeds back an actual longitudinal acceleration, and/or wherein a lateral acceleration sensor feeds back an actual lateral acceleration to the vehicle movement controller.

13. The method of claim 11 wherein:
    the vehicle movement controller transmits a rack force setpoint value to a front/rear road wheel actuator;
    the front/rear road wheel actuator transmits a motor torque setpoint value to a chassis kinematics; and
    the vehicle movement controller transmits a wheel torque setpoint value to a brake/drive system.

14. The method of claim 11 wherein at least one of:
setpoint value inputs from a driver or from an automated driving algorithm are converted into yaw acceleration setpoint values, in particular over a vertical axis, and translational acceleration setpoint values, in particular longitudinally and laterally;
a yaw acceleration is composed of a rack influence of a rack of a front and/or rear steering device and an axle yaw torque influence of a front and/or rear drive device;
each steering rack is controlled directly by way of a torque setpoint value of the drive device by way of a directly requested rack force;
each rack is controlled indirectly by way of a torque setpoint value of the brake and the drive device in a manner that is dependent on a torque steer effect of a suspension system; or
a yaw torque of each axle is controlled directly by way of a torque setpoint value of the brake and the drive device.

15. The method of claim 11 wherein at least one of:
for a given yaw acceleration setpoint value, a yaw torque setpoint value is calculated from vehicle inertia parameters;
based on power output of the actuators and their effect on a rack force and a yaw torque, a transfer function for each torque request of the actuators is implemented for respective ambient and vehicle conditions, including friction of road tires and radius of a suspension system;
the vehicle movement controller and the setpoint value processing means are configured as a multiple input multiple output controller, with a transfer function being used as feedforward boost, to control the actuators; or
the vehicle movement controller measures vehicle movement and actuator saturation, with the vehicle movement controller outputting a feedback information item to realize reference tracking.

* * * * *